(12) United States Patent
Estes

(10) Patent No.: US 11,564,342 B1
(45) Date of Patent: Jan. 31, 2023

(54) SOIL PREPARATION IMPLEMENT

(71) Applicant: Lloyd F. Estes, Springtown, TX (US)

(72) Inventor: Lloyd F. Estes, Springtown, TX (US)

(*) Notice: Subject to any disclaimer, the term of this patent is extended or adjusted under 35 U.S.C. 154(b) by 0 days.

(21) Appl. No.: 17/571,996

(22) Filed: Jan. 10, 2022

(51) Int. Cl.
*A01B 31/00* (2006.01)
*A01B 73/00* (2006.01)
*A01B 49/02* (2006.01)

(52) U.S. Cl.
CPC .............. *A01B 31/00* (2013.01); *A01B 49/02* (2013.01); *A01B 73/00* (2013.01)

(58) Field of Classification Search
CPC ......... A01B 31/00; A01B 49/02; A01B 23/04; A01B 19/04; A01B 63/00; A01B 73/00; A01B 73/02; A01B 73/04
USPC ....... 172/145, 193, 194, 195, 196, 197, 198, 172/199, 200, 776
See application file for complete search history.

(56) References Cited

U.S. PATENT DOCUMENTS

| | | | | | |
|---|---|---|---|---|---|
| 1,057,992 | A | * | 4/1913 | Andrew .................. | A01B 13/00 172/776 |
| 1,297,430 | A | * | 3/1919 | Winslow ................ | A01B 49/02 172/197 |
| 1,501,055 | A | * | 7/1924 | Lofton .................. | A01B 33/021 172/70 |
| 2,736,252 | A | * | 2/1956 | Latshaw ................ | A01B 19/00 172/198 |
| 2,820,405 | A | * | 1/1958 | Puckett .................. | A01B 19/02 172/698 |
| 2,868,306 | A | * | 1/1959 | Key ........................ | A01B 31/00 172/200 |
| 2,871,959 | A | * | 2/1959 | Koskenmaki .......... | A01B 19/02 172/449 |
| 3,225,839 | A | * | 12/1965 | Petitt ...................... | A01B 63/22 172/485 |
| 3,324,955 | A | * | 6/1967 | Perold .................... | A01B 31/00 172/197 |
| 3,448,814 | A | * | 6/1969 | Jackson ............... | A01B 49/027 172/170 |
| 3,500,936 | A | * | 3/1970 | Murlan .................. | A01B 49/02 172/198 |
| 3,684,029 | A | * | 8/1972 | Clover ................ | A01B 63/1115 172/729 |
| 3,739,860 | A | * | 6/1973 | Rogers .................... | A01B 19/08 172/612 |
| 4,252,199 | A | * | 2/1981 | van der Lely ......... | A01B 35/10 172/70 |
| 4,448,258 | A | * | 5/1984 | Mork .................... | A01B 49/027 172/197 |

(Continued)

*Primary Examiner* — Jamie L McGowan
(74) *Attorney, Agent, or Firm* — Law Office of Sam Sokhansanj PLLC

(57) ABSTRACT

A soil preparation apparatus having a first frame member configured to couple to a towing vehicle, wherein the first frame member comprises a blade member configured to engage soil. The apparatus can also include a second frame member pivotally secured to the first frame member, wherein the second frame member comprises an adjustable height protruding member configured to engage soil. The apparatus can also include a third frame member pivotally secured to the second frame member, wherein the third frame member comprises a plurality of bars configured to engage soil, and wherein the second frame member pivots relative to the first and third frame members.

19 Claims, 8 Drawing Sheets

(56) References Cited

U.S. PATENT DOCUMENTS

| | | | | |
|---|---|---|---|---|
| 4,924,945 A * | 5/1990 | Mork | E02F 3/7604 | 172/197 |
| 5,018,587 A * | 5/1991 | Gandrud | E01H 1/02 | 172/776 |
| 5,168,936 A * | 12/1992 | Stevens | A01B 23/043 | 172/198 |
| 5,213,164 A * | 5/1993 | Mork | E02F 3/8152 | 172/684.5 |
| 5,407,014 A * | 4/1995 | Tranmer | A01B 19/02 | 172/197 |
| 5,511,625 A * | 4/1996 | Mork | E02F 3/8152 | 172/449 |
| 5,699,863 A * | 12/1997 | Figura | A01B 49/02 | 172/197 |
| 5,769,171 A * | 6/1998 | Newman, IV | A01B 31/00 | 172/199 |
| 5,771,980 A * | 6/1998 | Mork | E02F 3/8152 | 172/449 |
| 5,806,605 A * | 9/1998 | Keigley | A01B 49/02 | 172/449 |
| 5,806,606 A * | 9/1998 | Robinson | A01B 63/32 | 172/198 |
| 5,833,011 A * | 11/1998 | Boertlein | E02F 5/32 | 172/197 |
| 5,833,012 A * | 11/1998 | Pierce | E02F 3/65 | 172/199 |
| 6,578,640 B1 * | 6/2003 | Ohlman | A01B 21/086 | 172/178 |
| 6,739,404 B2 | 5/2004 | Keigley | | |
| RE39,889 E | 10/2007 | Keigley | | |
| 7,478,682 B1 * | 1/2009 | Keigley | A01B 35/04 | 172/684.5 |
| 7,540,331 B1 | 6/2009 | Keigley | | |
| 8,944,176 B2 * | 2/2015 | Kiser | A01B 59/043 | 172/199 |
| 10,765,053 B1 * | 9/2020 | Keigley | A01B 31/00 | |
| 2004/0050564 A1 * | 3/2004 | Wilson | A01B 31/00 | 172/684.5 |
| 2007/0012464 A1 * | 1/2007 | Juergen | A01B 31/00 | 172/145 |
| 2008/0295366 A1 * | 12/2008 | Keane | A01B 45/00 | 37/403 |
| 2012/0234565 A1 * | 9/2012 | Kiser | A01B 63/24 | 172/669 |
| 2013/0264080 A1 | 10/2013 | Keigley | | |
| 2016/0073572 A1 * | 3/2016 | Evans | A01B 49/027 | 172/1 |
| 2017/0112043 A1 * | 4/2017 | Nair | A01B 33/08 | |
| 2018/0343783 A1 * | 12/2018 | Ayers | A01B 31/00 | |

* cited by examiner

SOIL PREPARATION IMPLEMENT

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

There are many situations in which soil must be scarified, scraped, smoothed, leveled, worked, and graded. Such situations can include soil-based arenas or show rings (such as for equine, animals, or agricultural events or sports), lawn and seed beds, dwelling construction, and road construction, among others. Specifically, such situations include the need to work the soil to the final grade prior to use by animals, road construction, and planting and seeding. For example, with respect to arenas or show rings for equine, such arenas must be repeatedly graded, scarified, and smoothed. In addition, in such arenas, it is important that the depth at which the soil is scarified or graded must be closely controlled.

Conventional soil grading implements lack multiple components that work independent of each other to perform various tasks or work on the soil. For example, some implements only perform the function of scarifying or tilling the soil, whereas others perform the function of grading or levelling, and others for smoothing. Moreover, such implements may require separate machinery to operate them, while others can be towed by a towing vehicle. In the scenario of towed implements, such towed implements are wheeled vehicles having tires that must be maintained and further include the challenge of training operators to tow a wheeled implement to accurately perform a certain function. In particular, the wheel or tire diameter on such implements are subject to deflation, wear, and other mechanical issues, wherein such drawbacks can affect the work quality and performance of the implement.

Hence, what is needed is a low-maintenance, easy to use, and cost-effective soil preparation implements that does not have wheels or tires and can efficiently and effectively perform multiple soil preparation operations such as scraping, scarifying, tilling, grading, leveling, and smoothing soil for any situation, among others.

BRIEF SUMMARY

In aspect of the disclosure described herein, a soil preparation apparatus is disclosed having a first frame member configured to couple to a towing vehicle, wherein the first frame member comprises a blade member configured to engage soil. The apparatus can also include a second frame member pivotally secured to the first frame member, wherein the second frame member comprises an adjustable height protruding member configured to engage soil. The apparatus can also include a third frame member pivotally secured to the second frame member, wherein the third frame member comprises a plurality of bars configured to engage soil, and wherein the second frame member pivots relative to the first and third frame members. In addition, the blade member can be controlled by one or more hydraulic units. Further, a hydraulic unit can be secured to both the first frame member and the second frame member. Here, the second frame member can be further secured to the first frame member via a flexible member. In addition, the plurality of bars of the third frame member is suspended via a plurality of overhead bar members. Here, a bracket can secure the height adjustable protruding member of the second frame member. Further, the second frame member can include channels on its sides, wherein the channels are adapted to divert soil. In addition, the angle of the second frame member, relative to a horizontal plane, is adjustable via a hydraulic unit. Further, the third frame member can include a pair of pivoting end members. In addition, neither the first, second, nor third frame member comprise ground rolling wheels.

In particular, the soil preparation implement, system, and apparatus of the disclosure described herein can create a smooth "sub-surface" for an animal, such as a horse (equine), that eliminates the risk of injury to the limbs of the horse, which may be caused by pockets or grooves in a surface, wherein the hooves of a horse may get caught or stuck. In addition, one of the advantages of the soil preparation implement of the disclosure described herein is its ability to aerate the soil, such as via a first section and blade of the apparatus, further serves to sanitize undesirable odors within or embedded in the soil, such as animal feces. In addition, the second section of the implement or apparatus can further create a desirable compaction layer that the horse finds desirable for stabilizing its limbs. In general, the implement of the disclosure described herein can create three layers of soil density, such as the lowest layer being sheared smooth, the middle layer which can be softer and fluffy relative to the lowest layer, and the upper most layer which can be a stabilizing layer for limb guidance. In addition, for Landscaping, all three layers of soil treatment provide a smooth base, a center section for desired compaction, and a upper most section compacted to facilitate construction, mitigate erosion, support sodding, reduce tracking issues.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

Figure 1:
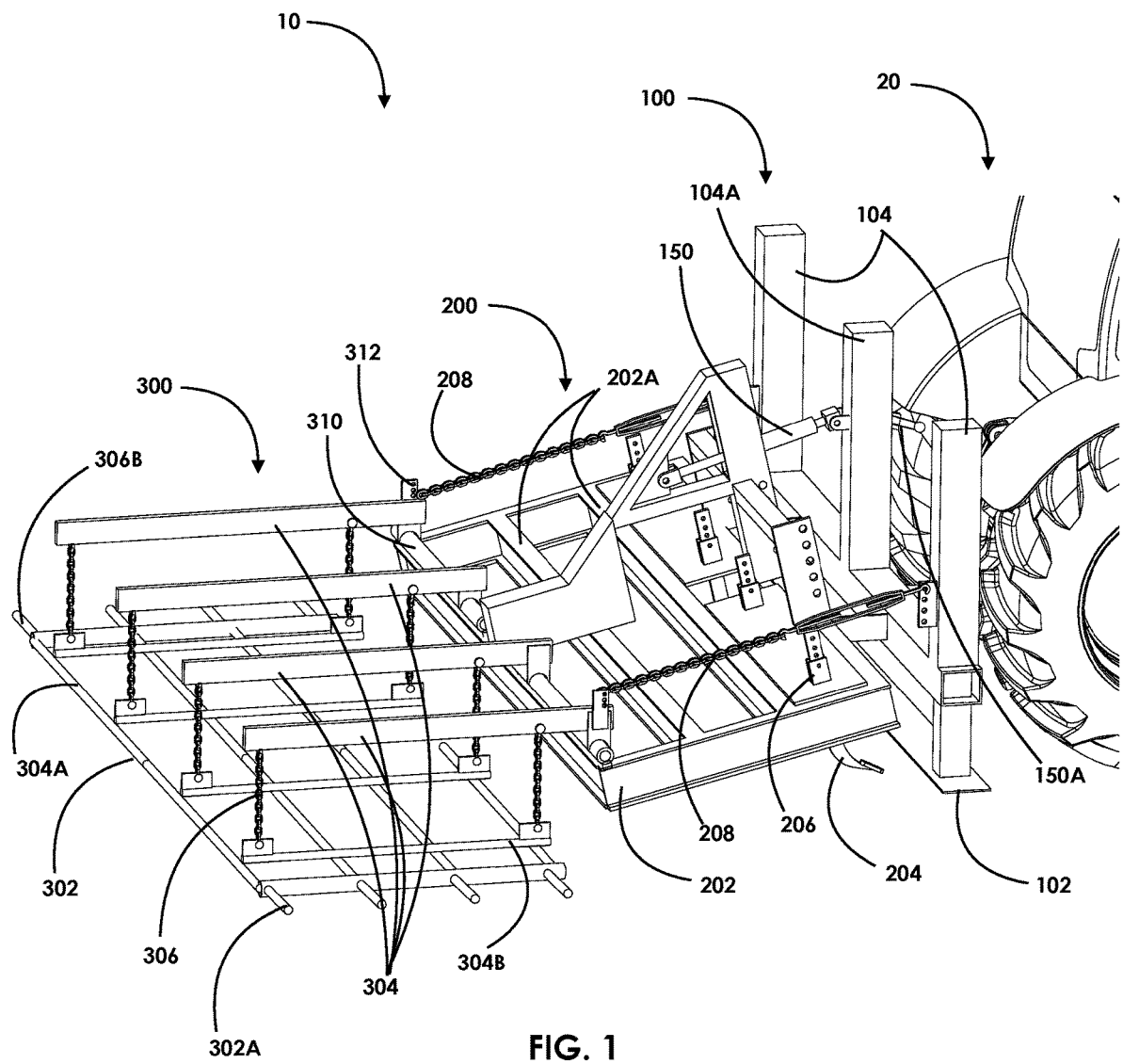
FIG. 1 illustrates a perspective side view of the soil preparation implement of the disclosure described herein.

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

FIGS. 1-8B illustrate one non-limiting embodiment of the soil preparation implement, system, and apparatus of the disclosure described herein. Here, implement or attachment 10 can be secured and coupled to any type of towing vehicle 20, such as a tractor, such that it can be towed, moved, and articulated to various formations and angles via hydraulics that are operated remotely or from the operator of the towing vehicle. In particular, the towing vehicle 20 may have various controls, a controller, or an electrical and hydraulic control units (not shown) that communicates with implement 10 in order to mechanically manipulate and articulate the various sections of implement 10. Further, implement 10 generally includes three sections, namely, a first frame or section member 100 secured to a rear of the tow vehicle 20, wherein section 100 is further pivotally secured to frame or section member 200, and wherein section 200 is further pivotally secured to frame or section member 300. Here, each section 100, 200, and 300 can perform a certain function or work on the soil that is to be prepared. For example, section 100 can perform any type of soil scraping, scarifying, breaking up, grading, and levelling; section 200 can perform any type of further soil scarifying, tilling, grading, and levelling; and section 300 can perform any type of further soil grading, levelling, and smoothing.

Figure 2:
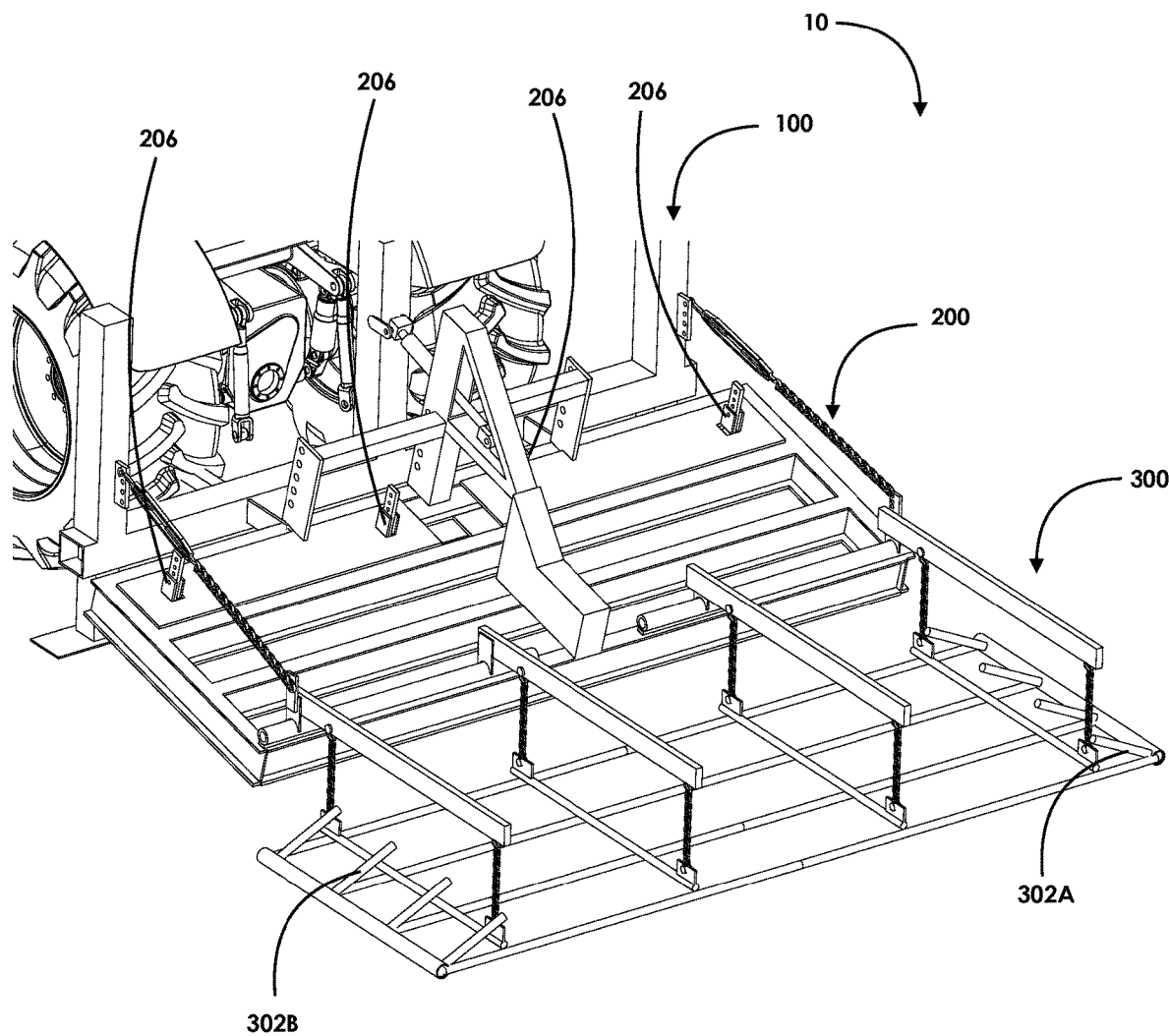
FIG. 2 illustrates a perspective rear view of the soil preparation implement of FIG. 1.
Figure 3:
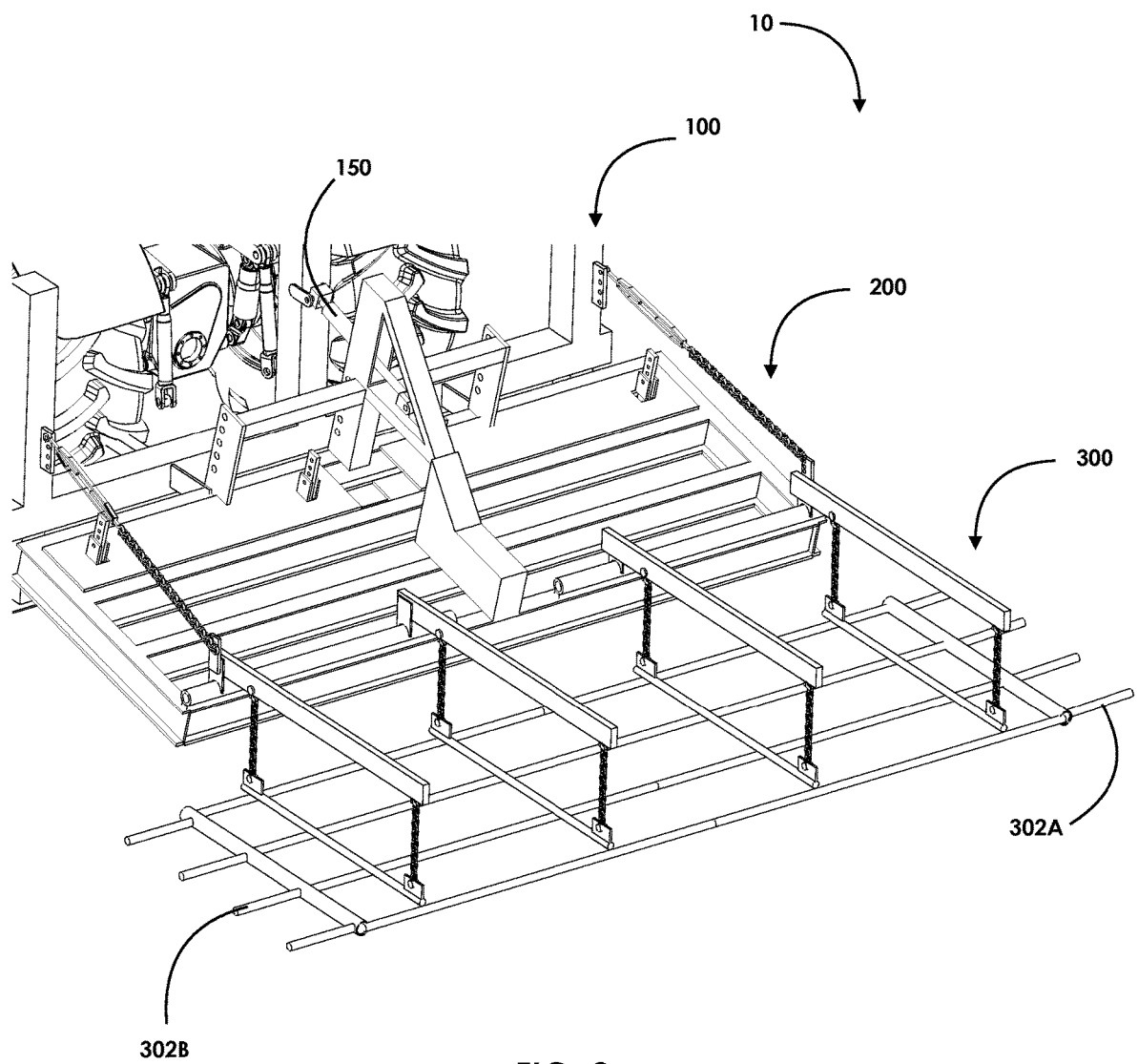
FIG. 3 illustrates another perspective rear view of the soil preparation implement of FIG. 1.
Figure 4:
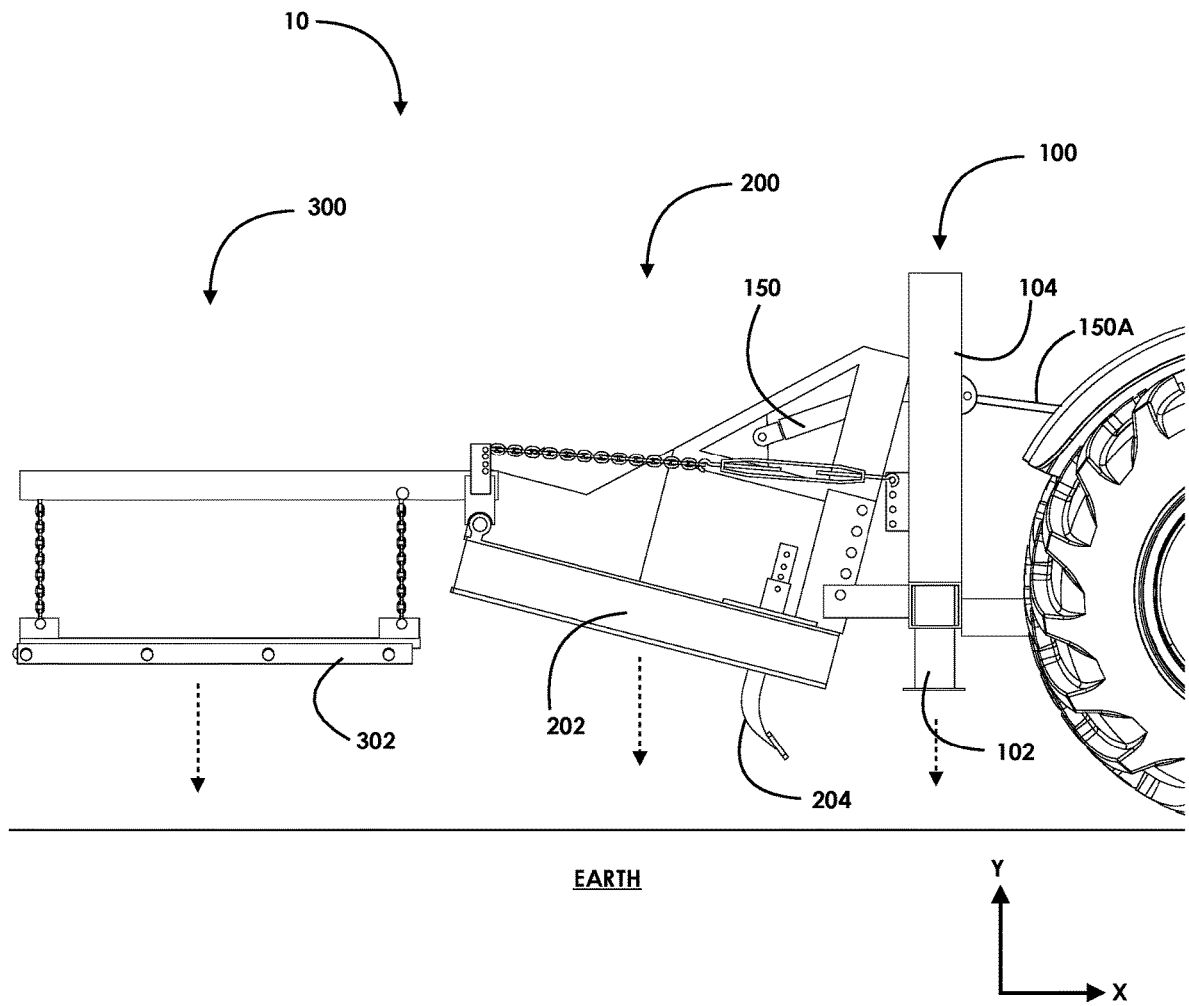
FIG. 4 illustrates a right-side view of the soil preparation implement of FIG. 1.
Figure 5:
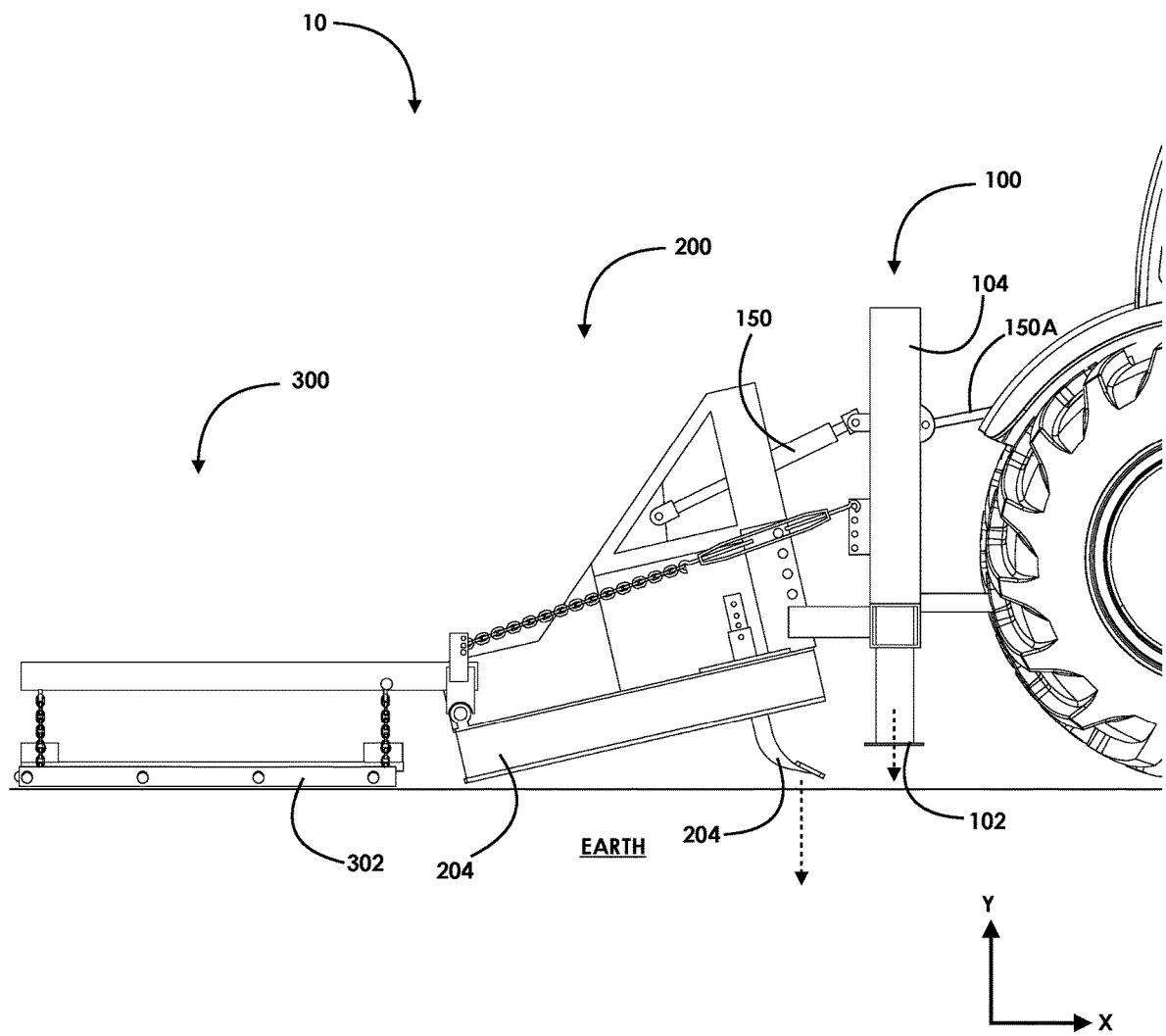
FIG. 5 illustrates another right-side view of the soil preparation implement of FIG. 1.
Figure 6:
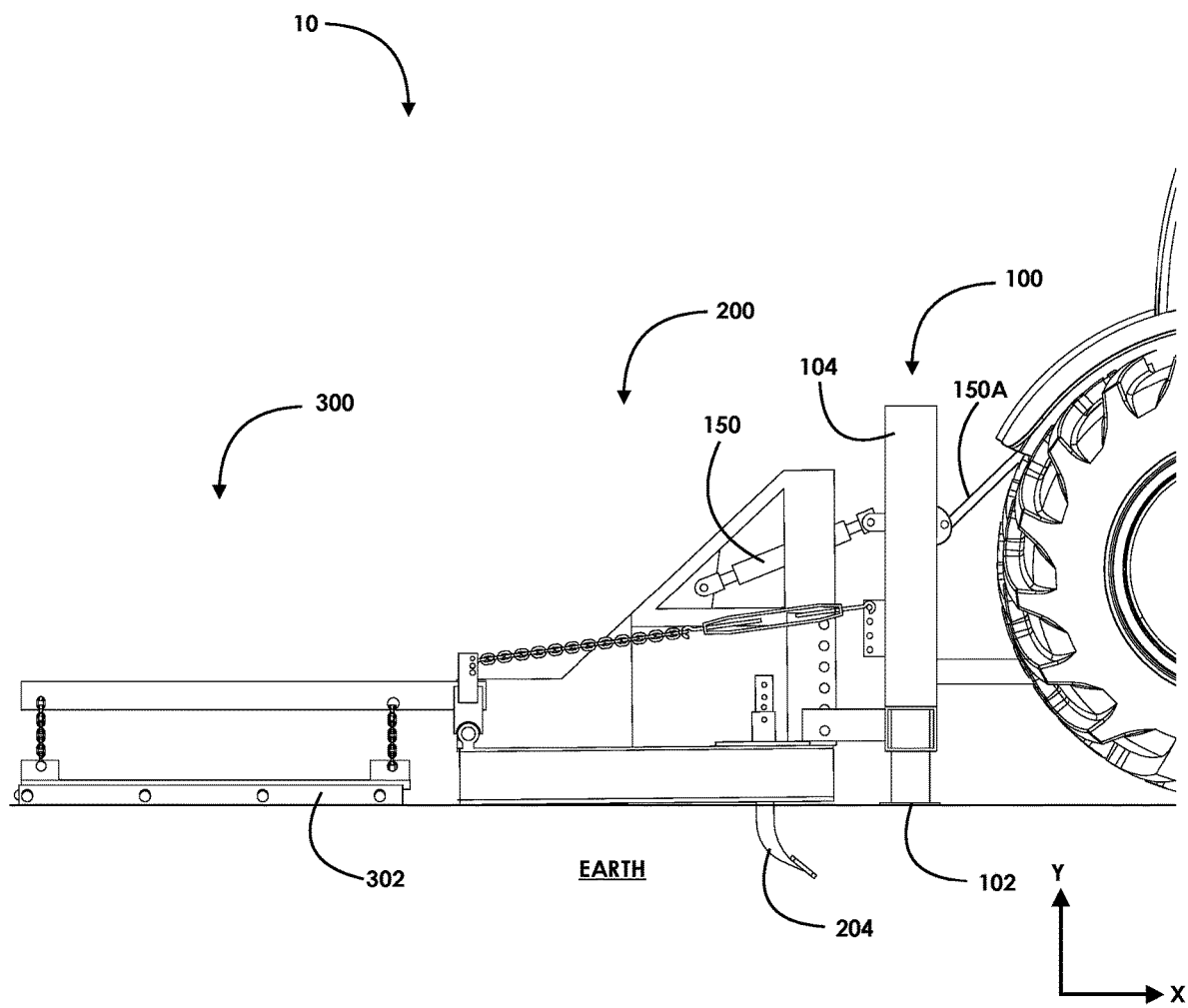
FIG. 6 illustrates another right-side view of the soil preparation implement of FIG. 1.

Still referring to FIGS. 1-8B, section 100 can include a hydraulically adjustable blade 102 having at least two telescoping support beams that each can extend therefrom and retract within corresponding receiving members 104, which may have hydraulic cylinders housed within them. Blade 102 can be an elongated bar having a tapered edge (or tapered profile) adapted to engage, dig, and break-up soil. Here, an operator can operate blade 102 via the aforementioned controller. Specifically, section 100 can be independently lowered via hydraulics and blade 102 can be further independently lowered via hydraulics, such that blade 102 engages, makes contact, and digs into the earth/soil, as shown in FIG. 6. Such hydraulics for controlling blade 102 can be two independent re-phase hydraulic cylinders located near each of the ends of blade 102, or each of members 10413. Once blade 102 is lowered and engaged with the soil, it can perform various functions, such as initial soil scraping, scarifying, breaking up, levelling, and grading, among others, in preparation for the work to be performed by section 200 of implement 10. In addition, blade 102 can also operate as a depth gauge. In particular, FIGS. 4-6 illustrate a sequence of events or a process by which members 104 and blade 102 are independently lowered such that blade 102 engages with the earth/soil. Further, center beam or member 104A can operate as a ballast, support structure, or anchor for the hydraulic cylinder 150 that connects section 100 to section 200.

In addition, center beam or member 104A can also be connected to the towing vehicle and also be adjustable and further articulate relative to the towing vehicle 20. Specifically, column 104A can connect to the towing vehicle via link member 150A. Here, link member 150A can be an adjustable length support member, such as via two telescoping members connected to each other via a hole and pin/locking member, or two threaded members connected to each, or an adjustable hydraulic piston type cylinder. Here, link member 150A can pivot relative to the towing vehicle and members 104 (or section 100). In particular, link member 150A can be articulated and rotated such that it adjusts the angle of members 104 and 104A relative to a vertical plane, and subsequently adjusting the angle of blade 102 relative to a horizontal plane. In particular, such adjustment or articulation of members 104 and 104A includes adjusting the angle of blade 102 relative to a horizontal plane or the earth, wherein such angles can depend on the soil moisture content, soil properties, among others. Further, the adjustable angles of blade 200 can also function to aerate the soil in preparation for compaction by section 200. Here, different types of aeration of the soil can be achieved depending on the angle of attack of blade 102 relative to the soil.

Figure 7:
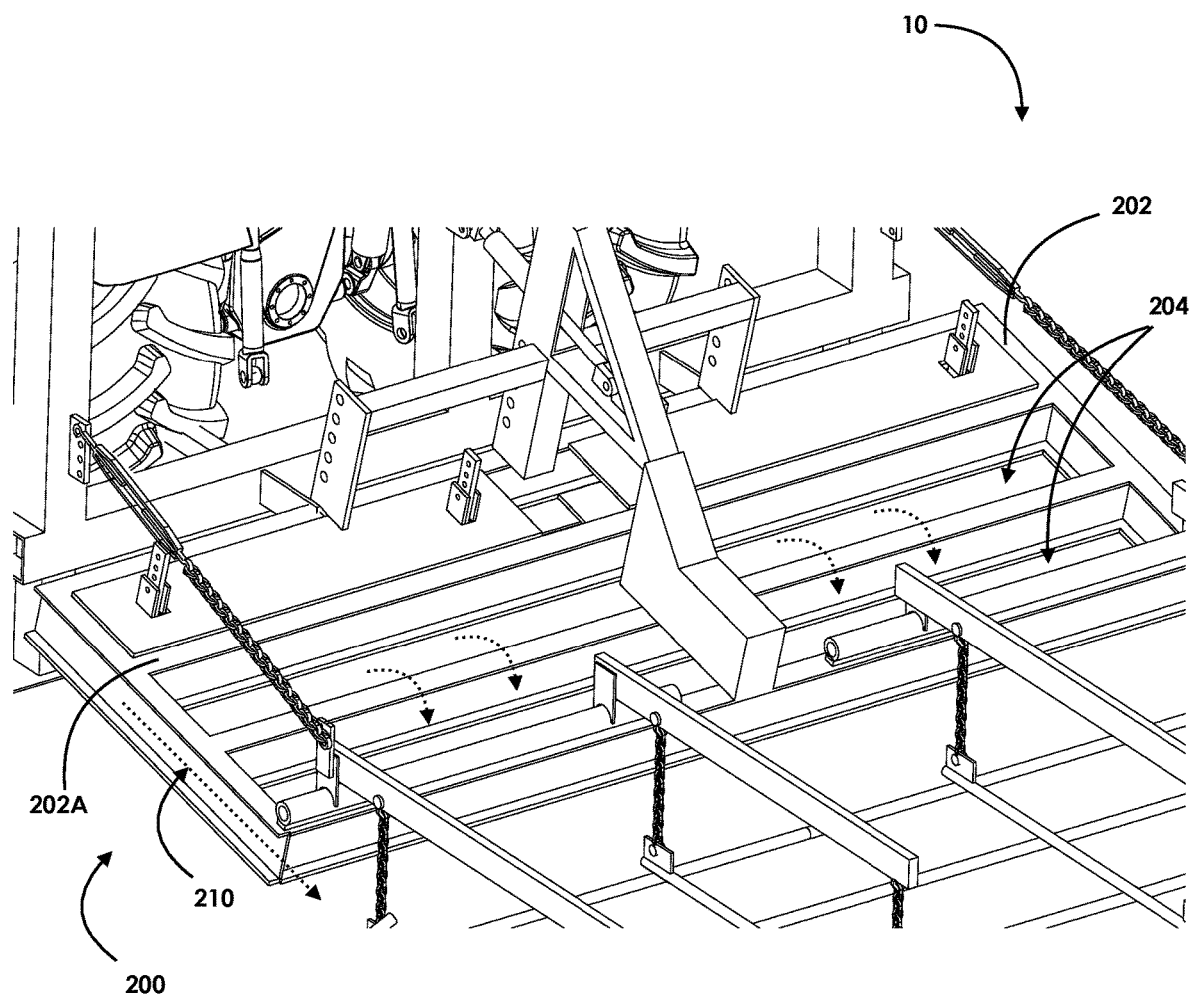
FIG. 7 illustrates a close-up perspective view of the soil preparation implement of FIG. 1.
Figure 8A:
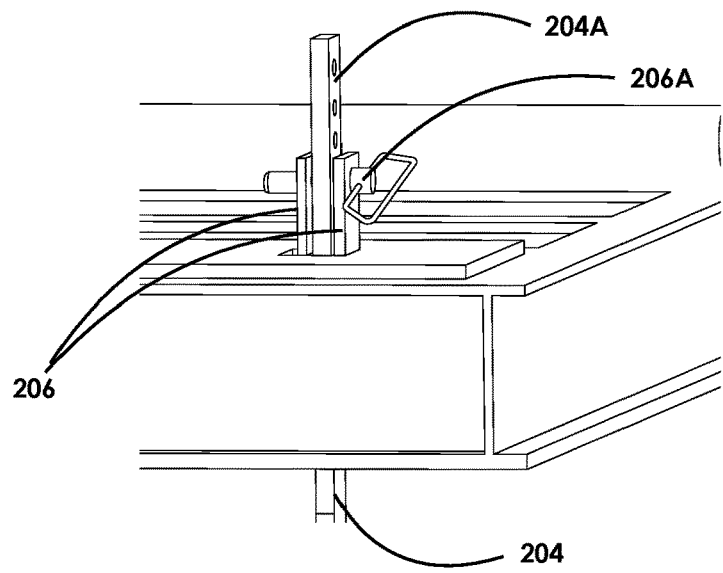
FIG. 8A illustrates a close-up perspective view of a ripper teeth bracket of the soil preparation implement of FIG. 1.
Figure 8B:
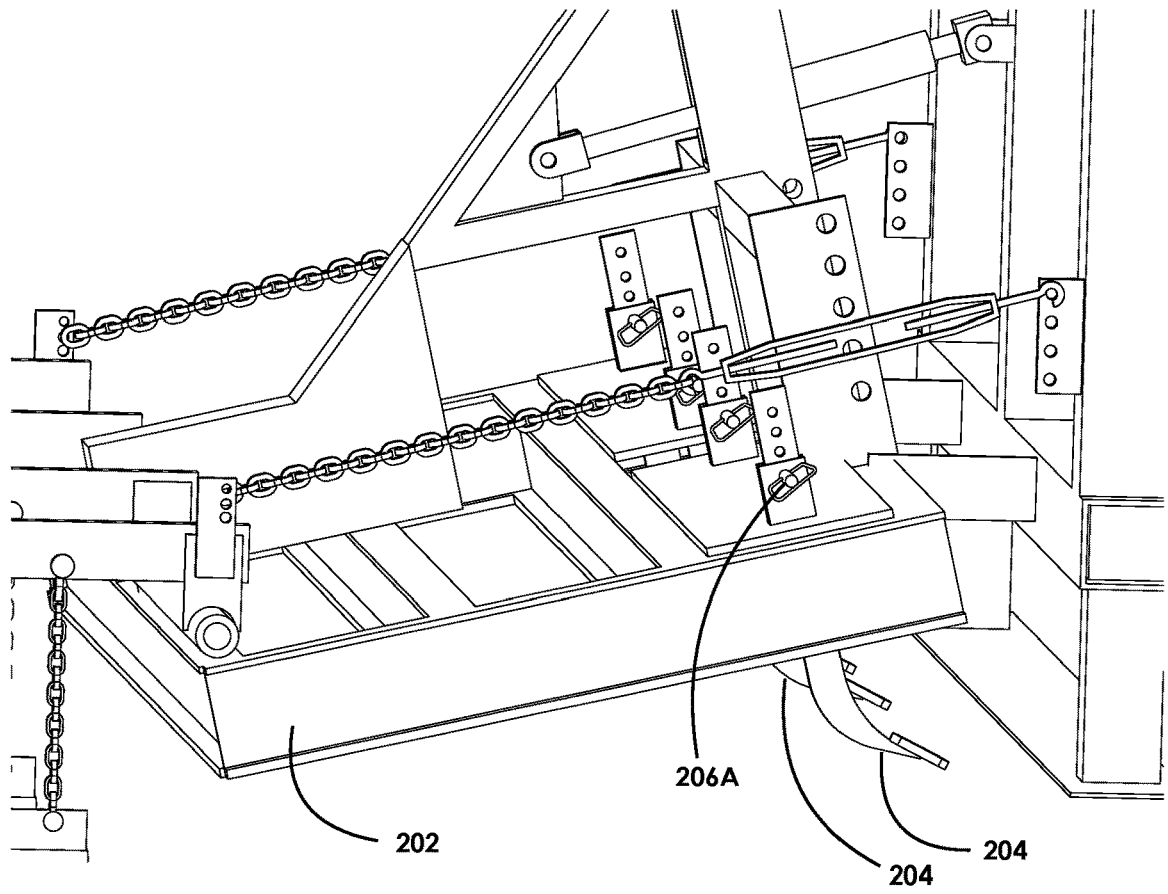
FIG. 8B illustrates a close-up perspective side view of the soil preparation implement of FIG. 1.

Still referring to FIGS. 1-8B, section 200 is shown to be pivotally secured to section 100 via a pair of flexible chain links 208 and hydraulic cylinder member 150. In particular, the length of links 208 can also be further adjusted to obtain optimal articulation of section 200. Here, section 200 is generally comprised of a frame 202 having support members 202A. As shown in FIG. 7, each support member 202A can further assist with moving soil (shown via hidden arrows), such that soil is allowed to freely and evenly move and spread over the top of each member 202A and into open areas 204 as section 200 is moved along (while in the engaged position as shown in FIG. 6). In addition, as shown in FIG. 7, frame 202 also includes C-channels 210 on its sides that further allow section 200 to freely and evenly guide accumulated soil from the front edge region of frame 202 towards its sides 210 (shown via hidden arrows). In addition, frame 202 of section 200 also include multiple ripper, scarifying, or tilling teeth, hooks, blades, anchors, or protrusions 204. As shown in FIG. 8A, each protrusion 204 includes a shank 204A that is received through an opening of frame 202 and between a pair of upstanding brackets 206, such that shank 204A is secured to frame 202 of section 200 via brackets 206. In addition, shank 204A can include multiple slots or apertures, such that the height of each protrusion 204 can be independently adjusted and secured to bracket 206 via securement pin or locking 206A received through the openings of brackets 206 and desired slot of shank 204A.

FIGS. 4-6 illustrate a sequence of events and a process for lowering, manipulating, articulating, and engaging section 200 with the earth/soil. Still referring to section 200. In particular, as shown in FIG. 4, in the initial (non-operational) position, section 200 can be raised well above the ground, such that rear of section 200 is at an acute angle relative to a horizontal plane or relative to the earth. As shown in FIG. 5, section 200 can be lowered to an operational position, wherein the angle of section 200 is manipulated and articulated via hydraulic cylinder 150. In particular, hydraulics 150 can articulate and rotate section 200 to any angle between zero to about 45-degrees relative to a horizontal plane. Specifically, the operator can articulate the angle of section 200, such that only section 300 is making contact with the earth/soil, but not sections 100 and 200. In the embodiment of FIG. 5, the front end of section 200 is at an acute angle relative to a horizontal plane or the earth. As shown in FIG. 5, the rear end edge of frame 202 can also make contact or engage the earth/soil for additional levelling or grading support in addition to the work to be performed by section 300. As shown in FIG. 6, section 200 can be further lowered and manipulated such that protrusion 204 penetrates the earth/soil and the bottom surface and the front edge surface of frame 202 make contact with the earth/soil. In particular, as implement 10 is being towed, protrusions 204 of section 200 dig into the earth to scarify, rip and break up the soil, rocks, and clay, wherein such soil is further guided over and around frame 202, such as via channels 210 or members 202A, as previously discussed, which prepares the soil for further grading, levelling, and smoothing via section 300.

Still referring to FIGS. 1-8B, section 300 is shown to be further pivotally secured to section 200 via a hinged or pivoting member 310 that is further connected to section 200 via brackets 312 on its opposing ends to chain link 208. Specifically, as the angle of section 200 is articulated or manipulated via hydraulics 150, chains 208 further either pulls or releases the pivoting member 310, such that rails 302 and 304 of section 300 can be articulated such that they are substantially parallel to a horizontal plane or the earth during the raising and lowering operations of section 200 as shown in FIGS. 4-6. Here, cylindrical rails 302 and 304 (which are transverse relative to each other), form a grid pattern, cross link, or lattice configuration that allow for additional levelling, grading, and smoothing of soil. The grid like configuration of section 300 allows the soil to freely and evenly move over and around rails 302 and 304 to provide a smooth levelled soil surface. Here, rail members 302 and 304 are further support and suspended via support members 104 that are each secured to rails 302 and 304 via chain links 306. In addition, as shown in FIGS. 2-3, the end members 302A and 302B of section 300 can also be pivotally connected to rails 302 and 304 via a hinge such that they can be folded up or down, in order for section 300 to achieve a more compact or stowed configuration. Such a compact folded up position can allow section 300 to fit through various openings (such as in arenas or garage openings), but still be able to cover additional square footage in its operational state with members 302A and 302B in their folded down position. In addition, members 302A and 302B (in their folded down position) can further smooth and level the soil that is being received from the sides of section 200.

From the foregoing it will be seen that the present disclosure described herein is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts described herein, except insofar as such limitations are included in following claims. Further, it will be understood that certain features and sub-combinations are of utility and may be employed without reference to other features and sub-combinations. This is contemplated by and is within the scope of the claims.

What is claimed is:

1. A soil preparation apparatus, comprising:
   a first frame member configured to couple to a towing vehicle, wherein the first frame member comprises a blade member configured to engage soil;
   a second frame member pivotally secured to the first frame member, wherein the second frame member comprises a plurality of adjustable height protruding members configured to engage soil, wherein each of the protruding members are spaced apart from each other and each comprise a shank at least partially disposed through a top and bottom opening of the second frame member; and
   a third frame member pivotally and directly secured to the second frame member, wherein the third frame member comprises a plurality of bars configured to engage soil, and wherein the second frame member pivots relative to the first and third frame members.

2. The soil preparation apparatus of claim 1, wherein the blade member is configured to adjust in height relative to the first frame member and controlled via one or more hydraulic units.

3. The soil preparation apparatus of claim 1, wherein a hydraulic unit is secured to both the first frame member and the second frame member.

4. The soil preparation apparatus of claim 1, wherein the second frame member is further secured to the first frame member via a flexible member.

5. The soil preparation apparatus of claim 1, wherein the plurality of bars of the third frame member is suspended via a plurality of overhead bar members.

6. The soil preparation apparatus of claim 1, wherein a bracket secures the height adjustable protruding member.

7. The soil preparation apparatus of claim 1, wherein the second frame member comprises a channel on each side, wherein the channels are adapted to divert soil.

8. The soil apparatus of claim 1, wherein the angle of the second frame member, relative to a horizontal plane, is adjustable via a hydraulic unit.

9. The soil apparatus of claim 1, wherein the third frame member further comprises a pair of pivoting end members.

10. The soil apparatus of claim 1, wherein neither the first, second, nor third frame member comprise rolling wheels.

11. The soil preparation apparatus of claim 1, wherein the second frame member comprises a channel on each side, wherein the channels are adapted to divert soil.

12. The soil apparatus of claim 1, wherein the angle of the second frame member, relative to a horizontal plane, is adjustable via a hydraulic unit.

13. The soil apparatus of claim 1, wherein the third frame member further comprises a pair of pivoting end members.

14. The soil apparatus of claim 1, wherein neither the first, second, nor third frame member comprise rolling wheels.

15. A soil preparation apparatus, comprising:
- a first frame member configured to couple to a towing vehicle, wherein the first frame member comprises an extendable blade member configured to engage soil;
- a second frame member pivotally coupled to the first frame member via a first flexible member, wherein the second frame member comprises a plurality of adjustable height protruding members configured to engage soil, wherein each of the protruding members are spaced apart from each other; and
- a third frame member pivotally and directly secured to the second frame member, wherein the third frame member comprises a plurality of bars configured to engage soil, wherein the bars are coupled to the third frame member via a plurality of second flexible members, and wherein the second frame member pivots relative to the first and third frame members.

16. The soil preparation apparatus of claim 15, wherein the blade member is configured to adjust in height relative to the first frame member and controlled via one or more hydraulic units.

17. The soil preparation apparatus of claim 15, wherein a hydraulic unit is secured to both the first frame member and the second frame member.

18. The soil preparation apparatus of claim 15, wherein the second frame member is further secured to the first frame member via a flexible member.

19. The soil preparation apparatus of claim 15, further comprising a plurality of openings within the second frame, wherein each of the protruding members are at least partially received through each of the openings of the second frame member.

\* \* \* \* \*